J. V. DUCKETT.
NUT LOCK.
APPLICATION FILED MAY 2, 1914.

1,153,898.

Patented Sept. 21, 1915.

Witnesses
Guy M. Spring.
H. H. Downing

Inventor
James V. Duckett.
By Richard Owen.
Attorney

UNITED STATES PATENT OFFICE.

JAMES V. DUCKETT, OF HILLSIDE, COLORADO.

NUT-LOCK.

1,153,898. Specification of Letters Patent. Patented Sept. 21, 1915.

Application filed May 2, 1914. Serial No. 835,988.

*To all whom it may concern:*

Be it known that I, JAMES V. DUCKETT, a citizen of the United States, residing at Hillside, in the county of Fremont and State of Colorado, have invented certain new and useful Improvements in Nut-Locks, of which the following is a specification.

My invention relates to nut locks.

The primary object of my invention is to provide an improved locking device associated with the nut and bolt for locking the nut upon the bolt and preventing the nut from having outward rotation on the bolt.

Another object of my invention is to provide an improved nut having novel means in connection therewith for removably receiving the locking device.

A further object of my invention is to provide a device that is simple in construction, efficient in operation and one that can be manufactured and placed upon the market at a minimum cost.

Other objects as well as the nature, characteristic features and scope of my invention will be more readily understood from the following description taken in connection with the accompanying drawings and pointed out in the claim.

Figure 1:
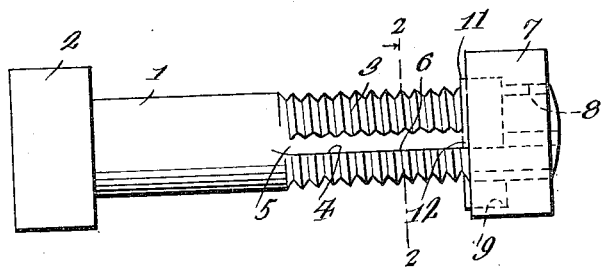
Figure 2:
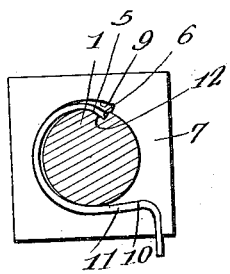
Figure 3:
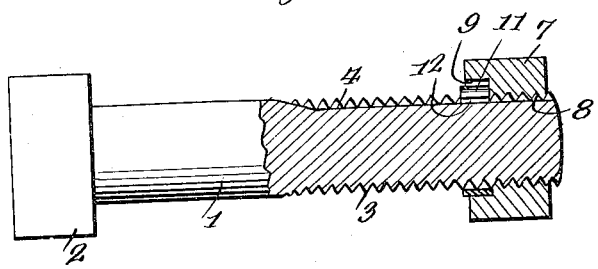

In the drawings: Figure 1 is a side elevational view of my invention showing the nut in locked position on the bolt. Fig. 2 is a transverse sectional view taken on the line 2—2 of Fig. 1 in the direction in which the arrow points and illustrating to advantage the construction of the locking element. Fig. 3 is a longitudinal sectional view of my invention, partly in elevation showing especially the manner of mounting the locking element.

Referring more particularly to the drawings in which similar reference numerals designate corresponding parts throughout the different views, I provide a bolt 1 with a head 2, the outer end of the bolt being screw threaded as at 3 and provided with a longitudinal groove 4, one side 5 of which is arranged parallel to a tangent on the circumference of the bolt and the other side 6 being arranged radially for the purpose to be hereinafter described.

A nut 7 having a screw threaded opening 8 therethrough is removably mounted upon the bolt. The nut is provided on its under surface adjacent the opening 8 with a substantial semi-annular recess 9, the latter having one end thereof in communication with one of the outer edges of the nut by means of a tortuous way 10, of a depth similar to the depth of the recess 9. The way 10 is arranged tangentially to the opening 8 and parallel with one side edge of the nut to a point adjacent and adjoining said edge, thence at right angles to the first mentioned edge.

Removably disposed in the recess 9 and the way 10 is a locking element 11 which conforms substantially to the contour of the recess and way and because of this fact longitudinal and lateral movement of the element is prevented. In this instance the locking element is preferably formed from a strip of rigid metal which has the inner end thereof bent slightly inwardly to form a tooth 12 for engagement within the groove 4 in the bolt. The other or outer terminal of the locking element projects laterally beyond one side of the nut and constitutes a gripping piece for facilitating the removal of the element when it is desired to remove the nut from the bolt when the nut and bolt are not in an operative position and when the locking element is jammed in the recess and the way.

The operation of my device is as follows: When it is desired to place a nut in locked position on the bolt, the locking element 11 is placed within the recess 9 and the way 10 communicating therewith and the nut is then screwed upon the bolt in the ordinary manner until the same has reached the desired place and until the inner end 12 of the locking element bears against the side 6 of the groove 4, the latter forming a substantially abutting shoulder for the element and positively prevents the nut from being worked outwardly upon the bolt.

It can be easily seen by those skilled in the art that I have provided a device that is simple in construction, and composed of a few simple parts that can be easily manufactured and when manufactured can be placed upon the market and sold at a minimum cost.

I desire to lay great stress upon the positioning of the recess and way having the locking element removably associated therewith as this forms the most essential feature of my invention.

It will be understood that the above description and accompanying drawings comprehend only the general and preferred embodiment of my invention and that various minor changes in details of construction, proportion and arrangement of the parts may be made within the scope of the appended claim and without sacrificing any of the advantages of my invention.

Having thus fully described my invention what I claim as new and desire to secure by Letters Patent is:—

The combination with a bolt having a longitudinal groove therein, of a nut provided on the under surface thereof about the opening with a semi-annular recess, said nut also provided with a tortuous way extending tangentially from one end of the recess and thence at right angles to one edge of the nut, said way being of a depth similar to the depth of the recess, a locking element removably mounted in and conforming to the contour of the recess and way, said way preventing lateral and longitudinal movement of said element in said recess, the inner end of the locking element being bent inwardly to form a tooth for engagement with the groove for preventing rotation of the nut, and the outer end of the locking element projecting beyond the side of the nut to form a gripping piece for facilitating the disengagement of the element from the nut.

In testimony whereof I affix my signature in presence of two witnesses.

JAMES V. DUCKETT.

Witnesses:
WALTER WALSH,
C. H. LEAVITT.

Copies of this patent may be obtained for five cents each, by addressing the "Commissioner of Patents, Washington, D. C."